Patented Mar. 20, 1951

2,545,461

UNITED STATES PATENT OFFICE 2,545,461

METHOD OF PREPARING VINYL RESIN SULFURIZED FURFURALDEHYDE REACTION PRODUCTS

Mortimer T. Harvey, South Orange, N. J., assignor to Harvel Research Corporation, a corporation of New Jersey No Drawing. Application May 11, 1949, Serial No. 92,747

14 Claims. (Cl. 260—45.5)

1

This invention relates to novel compositions of matter as well as to methods for preparing them. More particularly this invention is directed to novel compositions of matter produced by combining sulphur and/or a normally solid vinyl polymer and/or copolymer with an organic product obtained by reacting under alkaline conditions furfuraldehyde and one or more of the following ketones: acetone, diacetone alcohol, mesityl oxide and acetonyl acetone (hexandione-2,5).

The starting materials, namely the furfuraldehyde-ketone reaction products may be produced in an easy and simple manner and in commercial operation, with the aid of heat. In general they are produced by reacting furfuraldehyde and one or a mixture of two or more of said ketones under alkaline conditions provided by the presence of an alkaline agent such as sodium hydroxide, potassium hydroxide, lime or the like. For this purpose a mixture of furfuraldehyde and one or more of said ketones are placed in an appropriate reacting vessel and then there is added thereto a quantity of the desired alkaline catalyst. Usually the mole ratio of reactants is 1 to 2 moles of furfuraldehyde to each mole of said ketones. However, when acetonyl acetone is employed, I prefer that the mole ratio of furfuraldehyde to that ketone be in the range of 1–1 to 8–1.

Usually the furfuraldehyde and ketone are mixed with each other and then there is added thereto a quantity of one of the alkaline materials in aqueous solution. These components are mixed with each other in an autoclave or closed unit and shortly after the mixture takes place, an exothermic reaction occurs and sometimes the pressure within the autoclave will rise to a considerable degree. After the exothermic reaction has subsided, the reaction is practically complete. Then the entire mass may be externally heated to polymerize under alkaline conditions the compounds produced by the reaction. By employing this procedure with all of said ketones except acetonyl acetone, there may be produced reaction masses whose viscosities are in the range of 50 to 5000 centipoises at 25° C. which are the preferred class of starting materials to be employed herein and consist chiefly of a difurfural derivative of the ketone employed and a resin which is an alkaline polymerization product of such a compound, with the quantity of the resin being 5%–50% by weight of the reaction mass. When acetonyl acetone is the ketone employed, the resultant starting materials range in viscosity from a heavy ropy mass to a solid.

According to this invention these various starting materials may under alkaline conditions and preferably at a pH of 7.2 to 12 be combined with sulphur and/or one or more normally solid vinyl compounds. Examples of these vinyl compounds are polymers and copolymers of vinyl esters, vinyl acetals and vinylidene esters, such as polyvinyl chloride, polyvinyl acetate, polyvinyl formal, polyvinyl butyral, polyvinyl acetal, copolymers of vinyl chloride and vinyl acetate and copolymers of vinyl chloride and vinylidene chloride. Generally these starting materials are sulphurized so that the sulphur content thereof is in the range of 1%–30% by weight of the starting material. These starting materials with or without sulphur may be combined with the various polymers and copolymers in the proportions of 2 to 50 parts by weight of the vinyl compounds to 100 parts by weight of the unsulphurized starting material or based on the weight of said starting material in said sulphurized product.

The starting materials either before or after dehydration and under alkaline conditions may be mixed with free sulfur in the proportion of 100 parts of the former to 1 to 30 parts of the latter. Instead of employing free sulphur there may be employed various sulphides, in which the sulphur is available, such as sulphur chloride, sodium polysulphide, etc. This alkaline mixture while constantly agitated is heated and maintained at a temperature of 260–350° F. whereupon the starting material becomes sulphurized or chemically combined with the sulphur. Then the sulphurized product containing 1%–30% sulphur may be poured into pans and cooled and find utility as vulcanization and softening agents for rubbery materials, such as natural rubber, reclaimed rubber, as well as the so-called synthetic rubbery polymers of butadiene and chloroprene and the rubbery copolymers of butadiene and styrene and butadiene and acrylonitrile. The sulphurized products may also be mixed with one or more of the vinyl compounds in the proportions of 130 parts of the former to 15–65 parts of the latter. The sulphurized starting material and one or more of the vinyl compounds are mixed with each other and while being constantly agitated the mixture is heated and maintained at a temperature between 260–325° F. until the mass is lump-free and substantially smooth. Then it is poured into shallow pans and allowed to cool to room temperature and the products so produced are in the nature of gels whose rigidity characteristic is roughly proportional to the percentage of vinyl compound employed. These products may be employed as plasticizers for said rubbery materials and impart good resistance to permanent set when compounded with rubbery polymers of butadiene-acrylonitrile. In addition, they serve as oil resistant extenders for said various rubbery materials.

Products different from as well as some similar to the last described products may be made by adding 2 to 50 parts of the vinyl compound to 100 parts of any of the unsulphurized starting materials and heating the mixture at 260° F.–325° F. until a substantially homogeneous smooth mass is produced. These may be poured into pans and cooled and may also be used as extenders, softeners and modifiers in said rubbery materials. If desired, and while hot and under alkaline conditions, 1 to 30 parts of sulphur may be added to the starting material-vinyl mass and the temperature of the mix is maintained at a temperature of 260–300° F. until the mass is sulphurized. Then the entire mass is poured into pans and cooled. Other methods may be followed for producing similar sulphurized materials. They may be done by adding the sulphur and vinyl compound directly to the unsulphurized starting material which may or may not have been dehydrated but is preferably dehydrated. The mixture is agitated and maintained at 270–325° F. until smooth and homogeneous and then is poured into pans and allowed to cool to room temperature. All of these products in which both sulphur and one or more of the vinyl compounds have been employed are in the nature of gels which may vary in characteristics from a soft rubbery nature to a fairly rigid solid. These sulphurized products containing one or more of the vinyl compounds may be further heated to 275° F. for approximately 16 hours to obtain a rubbery infusible mass.

In all of these methods where a vinyl compound is employed I prefer to employ for certain purposes those copolymers of vinyl chloride and vinyl acetate containing 85%–97% vinyl chloride and 15%–3% vinyl acetate. The other polymers and copolymers find specific application.

PREPARATION OF FURFURAL-KETONE STARTING MATERIALS

The following examples A–F will be set forth merely by way of illustrating some of the specific methods which may be followed to produce illustrative starting materials of this invention, all parts being by weight unless otherwise specified.

*Example A*

1800 parts furfuraldehyde
945 parts acetone
16 parts caustic soda
32 parts water
20.75 parts sulfuric acid
41.5 parts water A mixture of 16 parts of caustic soda and 32 parts of water is prepared and allowed to cool. In a separate container, a mixture of 20.75 parts of sulfuric acid and 41.5 parts of water is prepared. Into a Monel metal unit equipped with stirrer and having cold water on the jacket, a mixture of 200 parts furfural and 105 parts of acetone is weighed in. One-ninth of the caustic soda-water solution is added and the mass is allowed to react. When the temperature stops rising another prepared batch of 200 parts furfural and 105 parts of acetone is pumped into the unit and another one-ninth of the caustic soda-water solution is added whereupon the temperature rises. When the temperature stops rising there is added thereto another prepared batch of 400 parts of furfural and 210 parts of acetone and subsequently two-ninths of the caustic soda-water solution. Thereafter a prepared batch of 500 parts of furfural and 262.5 parts of acetone is pumped into the unit and another two-ninths of the caustic soda-water solution is added, and finally the remaining batch consisting of 500 parts of furfural and 262.5 parts of acetone is added and the remainder of the caustic soda-water solution. The entire mass is refluxed for 30 minutes at 190–195° F. Chilling is then started and the sulphuric acid solution is added to neutralize the mass which is then chilled to 125° F. and vacuum applied for dehydration. Heat is applied and vacuum continued until the temperature reaches 195° F. Thereupon the heat and vacuum are cut off, chilling started, samples taken and when cooled to 150° F. the mass is pumped to a storage tank. This product is a starting material known herein as material A.

*Example B*

200 parts furfuraldehyde
232 parts diacetone alcohol
1 part sodium hydroxide dissolved in
1 part water were mixed together whereupon an exothermic reaction occurred. After the exothermic reaction had subsided, the mass was heated to boiling and maintained in this state of boiling in a reflux condenser for approximately one hour. The mass was then neutralized with dilute sulfuric acid and was subsequently dehydrated under vacuum and is a starting material hereinafter known as material B.

*Example C*

96 parts furfuraldehyde
98 parts mesityl oxide
1 part sodium hydroxide dissolved in
1 part water were mixed together and placed under a reflux condenser. The mixture was maintained in a state of boiling for about one hour. Then it was neutralized with dilute sulfuric acid and dehydrated under vacuum to provide a starting material herein known as material C.

*Example D*

96 parts furfuraldehyde
114 parts acetonyl acetone
1 part sodium hydroxide dissolved in
1 part water were mixed together under a reflux condenser whereupon a vigorous exothermic reaction occurred. After the exothermic reaction had subsided heat was applied and the mass maintained at boiling for about one hour. It was then neutralized with dilute sulfuric acid and dehydrated under vacuum to provide a starting material known hereinafter as material D.

*Example E*

96 parts furfuraldehyde
28 parts acetonyl acetone
1 part sodium hydroxide dissolved in
1 part water were mixed together under a reflux condenser, whereupon an exothermic reaction took place. After the exothermic reaction had subsided heat was applied to maintain the mass at boiling for about one hour. Then it was neutralized with dilute sulfuric acid and dehydrated under vacuum to provide a starting material hereinafter known as material E.

*Example F*

96 parts furfuraldehyde
14 parts acetonyl acetone
1 part sodium hydroxide dissolved in
1 part water were mixed together and then heated under a reflux condenser and maintained in the state of boiling for about one hour. The mass was then neutralized with dilute sulfuric acid and dehydrated under vacuum to provide a starting material hereinafter known as material F.

PREPARATION OF SULPHURIZED (FURFURAL-KETONE STARTING MATERIALS)

The following are illustrative examples of some of the novel products of this invention as well as the methods for preparing them all parts being given by weight.

*Example S-1*

100 parts of any one or a combination of two or more of said materials A-F is placed in a jacketed dough mixer. Then there is added thereto a solution consisting of .22 part of caustic soda in .44 part of water and also 5 parts of powdered sulphur. This alkaline mixture, while being constantly agitated, is heated and maintained at a temperature of 260-350° F. for a period of about one hour whereupon the starting material becomes sulphurized by combining chemically with the sulphur. Then the sulphurized mass is poured into pans and allowed to cool and this product is hereinafter known as product S-1.

*Example S-2*

Following the same procedure as that set forth in Example S-1 except that 15 parts of powdered sulphur are employed, there is produced a product known hereinafter as product S-2.

*Example S-3*

Following the same procedure as that set forth in Example S-1 except that 25 parts of powdered sulphur are employed, there is produced a product known hereinafter as product S-3.

PREPARATION OF FURFURAL-KETONE STARTING MATERIAL COMBINED WITH NORMALLY SOLID VINYL COMPOUNDS

The following are illustrative examples of said starting material combined with the various vinyl compounds, all parts being given by weight.

*Example V-1*

100 parts of any one or a combination of two or more of said materials A-F together with 5 parts of one or more of said vinyl compounds are placed in a dough mixer and heated to a temperature of 260-325° F. until a substantially homogeneous, smooth mass is produced. It is then poured into pans and cooled and is a gel hereinafter known as product V-1.

*Example V-2*

Following the same procedure as that set forth in Example V-1 except that 20 parts of one or more of said vinyl compounds is employed, there is produced a gel known herein as product V-2.

*Example V-3*

Following the same procedure as that set forth in Example V-1 except that 40 parts of one or more of said vinyl compounds is employed, there is produced a gel known herein as product V-3.

PREPARATION OF SULPHURIZED (FURFURAL-KETONE STARTING MATERIAL) COMBINED WITH VINYL COMPOUNDS

*Example SV-1*

400 parts of one or a combination of 2 or more of said materials A-F
.88 part caustic soda
1.76 parts water
40 parts sulphur (powdered)
40 parts Vinylite VYNW (copolymer of vinyl chloride and vinyl acetate)

The material A-F together with the sulphur are placed in a jacketed dough mixer. They are heated to 275-280° F. and then the heat is shut off and the caustic soda mixed with the water is added cautiously to avoid foaming over. The caustic soda-water solution addition requires at least ½ hour, leaving the cover of the mixer open so that the water may be permitted to evaporate. The Vinylite is then added and the temperature raised to 290° F. Mixing at 290° F. is continued until all of the Vinylite is in solution. The product is then run into pans lined with varnished cambric and allowed to cool to room temperature. The resultant product is a rubbery gel known as product SV-1.

*Example SV-2*

Following the same procedure as that set forth in Example SV-1, with the sole exception being that "Saran 120" (a copolymer of vinyl chloride and vinylidene chloride) is substituted for the copolymer of the vinyl chloride and vinyl acetate, there is produced a product which is a rubbery gel known herein as product SV-2.

*Example SV-3*

Following the same procedure as that set forth in Example SV-1 with the sole exception being that polyvinyl butyral is substituted for the copolymer of the vinyl chloride and vinyl acetate, there is produced a product which is a rubbery gel and is known herein as product SV-3.

*Example SV-4*

The mass in each of Examples A-F after the refluxing and just before the neutralization step is to take place and is now dispensed with, has added thereto 1-30 parts of sulfur based on 100 parts of starting materials therein. The mix is maintained at a temperature of 260-350° F. for about one hour to sulphurize the material. If desired, it may be dehydrated and with or without neutralization poured into pans and cooled to provide products SA-SF, or there may be added thereto a normally solid vinyl compound in the proportion herein given and the resultant mass is maintained at 260-325° F. and stirred until smooth and homogeneous, dehydrated, then poured into pans and cooled to provide gels known as SV products.

This application is a continuation in part of my copending application Serial No. 783,229 filed October 30, 1947 and now abandoned.

I claim:

1. A novel composition of matter produced by heating together a normally solid vinyl compound selected from the group consisting of polyvinyl chloride, polyvinyl acetate, polyvinyl formal, polyvinyl butyral, polyvinyl acetal, copolymers of vinyl chloride and vinyl acetate and copolymers of vinyl chloride and vinylidene chloride and a sulphurized organic reaction product, said organic reaction product produced by reacting under alkaline conditions furfuraldehyde and a ketone selected from the group consisting of acetone, mesityl oxide, acetonyl acetone and diacetone alcohol.

2. A novel composition of matter produced by heating together a normally solid vinyl compound selected from the group consisting of polyvinyl chloride, polyvinyl acetate, polyvinyl formal, polyvinyl butyral, polyvinyl acetal, copolymers of vinyl chloride and vinyl acetate and copolymers of vinyl chloride and vinylidene chloride and an organic reaction product, said organic reaction product produced by reacting under alkaline conditions furfuraldehyde and a ketone selected from the group consisting of acetone, mesityl oxide, acetonyl acetone and diacetone alcohol.

3. A novel composition of matter produced by heating together a normally solid vinyl compound selected from the group consisting of polyvinyl chloride, polyvinyl acetate, polyvinyl formal, polyvinyl butyral, polyvinyl acetal, copolymers of vinyl chloride and vinyl acetate and copolymers of vinyl chloride and vinylidene chloride and a sulphurized organic reaction product, said organic reaction product produced by reacting under alkaline conditions furfuraldehyde and acetone.

4. A novel composition of matter produced by heating together a normally solid vinyl compound selected from the group consisting of polyvinyl chloride, polyvinyl acetate, polyvinyl formal, polyvinyl butyral, polyvinyl acetal, copolymers of vinyl chloride and vinyl acetate and copolymers of vinyl chloride and vinylidene chloride and a sulphurized organic reaction product, said organic reaction product produced by reacting under alkaline conditions furfuraldehyde and diacetone alcohol.

5. A novel composition of matter produced by heating together a normally solid vinyl compound selected from the group consisting of polyvinyl chloride, polyvinyl acetate, polyvinyl formal, polyvinyl butyral, polyvinyl acetal, copolymers of vinyl chloride and vinyl acetate and copolymers of vinyl chloride and vinylidene chloride and a sulphurized organic reaction product, said organic reaction product produced by reacting under alkaline conditions furfuraldehyde and mesityl oxide.

6. A novel composition of matter produced by heating together a normally solid copolymer of vinyl chloride and vinyl acetate and a sulphurized organic reaction product, said organic reaction product produced by reacting under alkaline conditions furfuraldehyde and a ketone selected from the group consisting of acetone, mesityl oxide, acetonyl acetone and diacetone alcohol.

7. A novel composition of matter produced by heating together a normally solid copolymer of vinyl chloride and vinyl acetate and a sulphurized organic reaction product, said organic reaction product produced by reacting under alkaline conditions furfuraldehyde and acetone.

8. A novel composition of matter produced by heating together a normally solid copolymer of vinyl chloride and vinyl acetate and a sulphurized organic reaction product, said organic reaction product produced by reacting under alkaline conditions furfuraldehyde and diacetone alcohol.

9. A novel composition of matter produced by heating together a normally solid copolymer of vinyl chloride and vinyl acetate and a sulphurized organic reaction product, said organic reaction product produced by reacting under alkaline conditions furfuraldehyde and mesityl oxide.

10. A novel composition of matter produced by heating together a normally solid copolymer of vinyl chloride and vinylidene chloride and a sulphurized organic reaction product, said organic reaction product produced by reacting under alkaline conditions furfuraldehyde and a ketone selected from the group consisting of acetone, mesityl oxide, acetonyl acetone and diacetone alcohol.

11. A sulphurized organic reaction product, said organic reaction product produced by reacting under alkaline conditions furfuraldehyde and a ketone selected from the group consisting of acetone, mesityl oxide, acetonyl acetone and diacetone alcohol.

12. A sulphurized organic reaction product, said organic reaction product produced by reacting under alkaline conditions furfuraldehyde and acetone.

13. A sulphurized organic reaction product, said organic reaction product produced by reacting under alkaline conditions furfuraldehyde and diacetone alcohol.

14. A sulphurized organic reaction product, said organic reaction product produced by reacting under alkaline conditions furfuraldehyde and mesityl oxide.

MORTIMER T. HARVEY.

No references cited.